United States Patent [19]
Sharber

[11] Patent Number: 5,214,873
[45] Date of Patent: Jun. 1, 1993

[54] ELECTROFISHING POLE

[76] Inventor: Norman G. Sharber, 515 W. Havasupi Rd., Flagstaff, Ariz. 86001

[21] Appl. No.: 874,630

[22] Filed: Apr. 27, 1992

[51] Int. Cl.⁵ .......................... A01K 79/02
[52] U.S. Cl. ................................ 43/17.1
[58] Field of Search ................ 43/17.1, 98

[56] References Cited

U.S. PATENT DOCUMENTS

| | | | |
|---|---|---|---|
| 1,974,444 | 9/1934 | Burkey | 43/17.1 |
| 2,233,045 | 2/1941 | Bonner | 43/17.1 |
| 2,605,742 | 8/1952 | Burkey | 43/17.1 |
| 2,709,984 | 6/1955 | Marks | 43/17.1 |
| 2,818,672 | 1/1958 | Kreutzer | 43/17.1 |
| 3,363,356 | 1/1968 | Kreutzer | 43/17.1 |
| 3,369,318 | 2/1968 | Kreutzer | 43/17.1 |
| 3,484,665 | 12/1969 | Mountjoy | 43/17.1 |
| 3,693,276 | 9/1972 | Kurc | 43/17.1 |
| 4,825,810 | 5/1989 | Sharber | 43/17.1 |
| 4,839,980 | 6/1989 | Hersom | 43/17.1 |

OTHER PUBLICATIONS

*Electronics Illustrated*, May 1961 pp. 88–90.

Primary Examiner—Kurt C. Rowan
Attorney, Agent, or Firm—Cahill, Sutton & Thomas

[57] ABSTRACT

A water permeable barrier is disposed about at least one electrode of the anode and cathode electrodes of electrofishing apparatus to shield the electrode against contact by the fish, the operator and other objects while maintaining the capability of establishing an electric field sufficient to induce petit mal in the fish.

25 Claims, 3 Drawing Sheets

FIG. 1
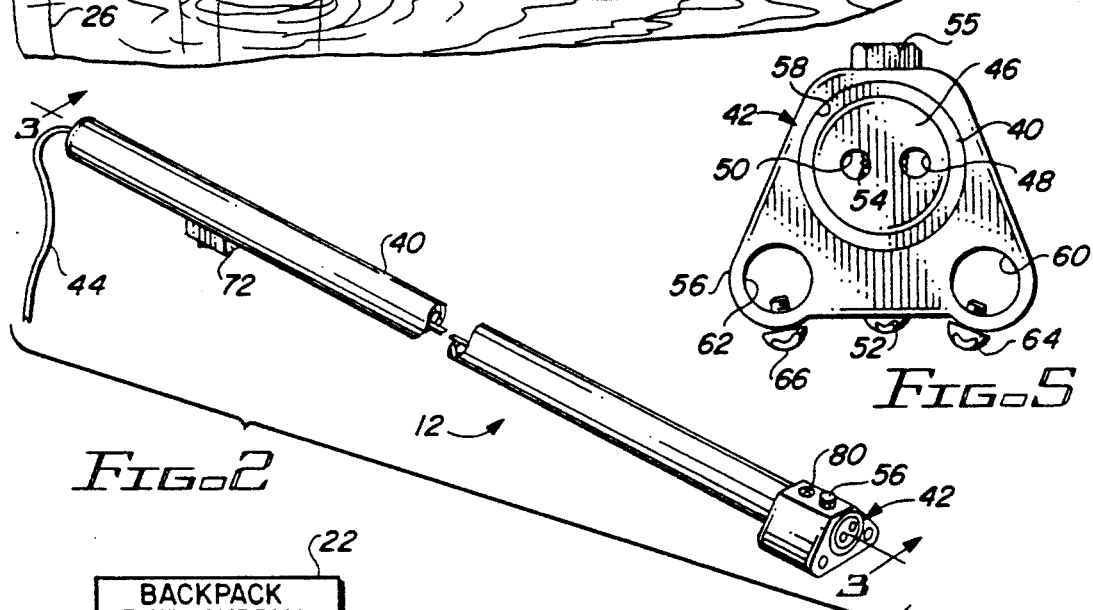
FIG. 2
FIG. 5
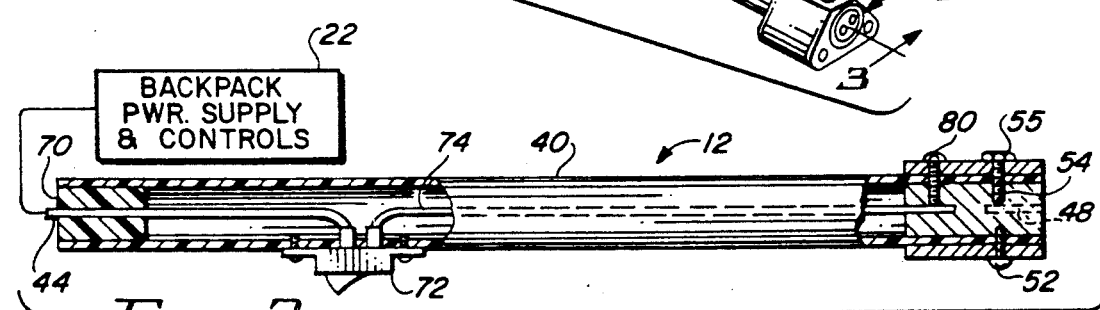
FIG. 3
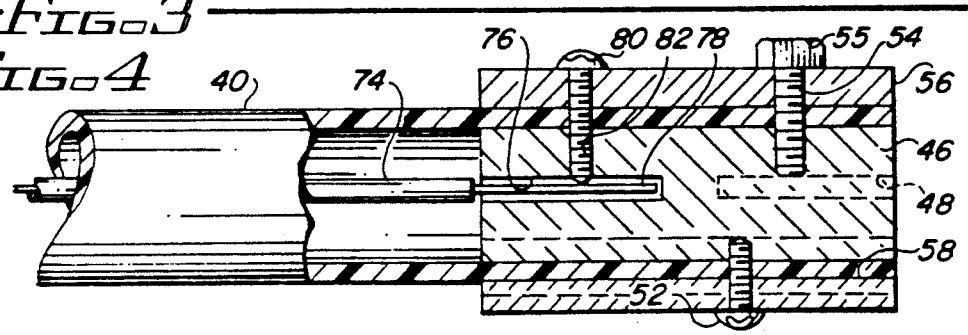
FIG. 4

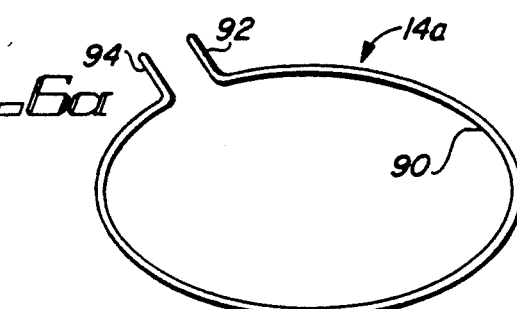
FIG. 6a
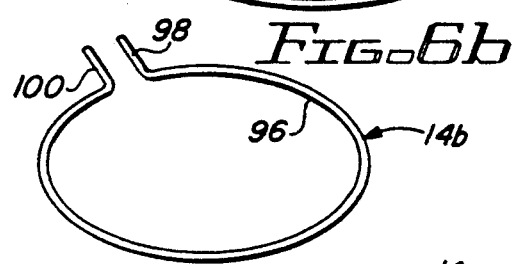
FIG. 6b
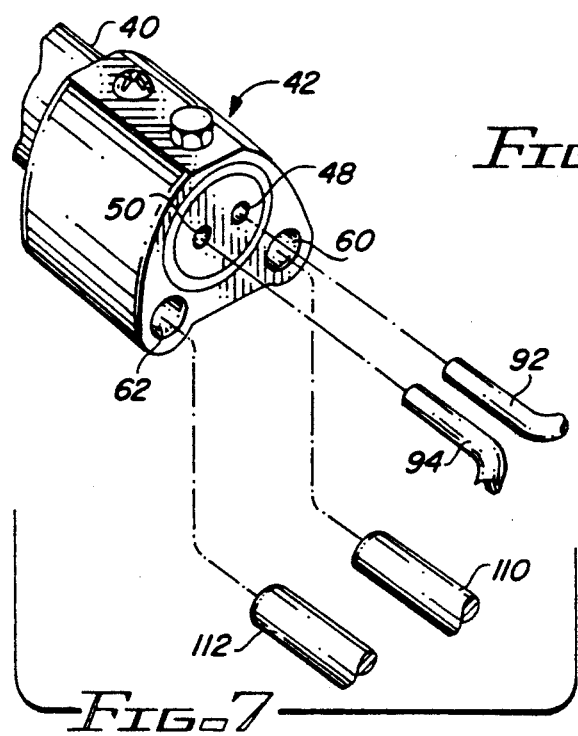
FIG. 7
FIG. 6c
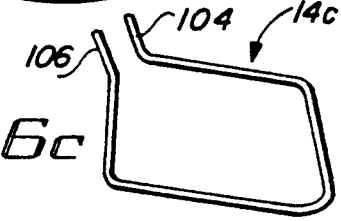
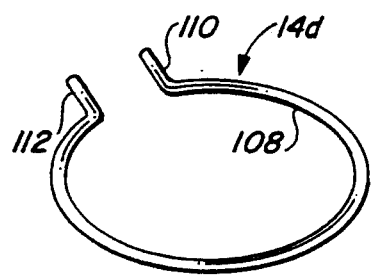
FIG. 6d
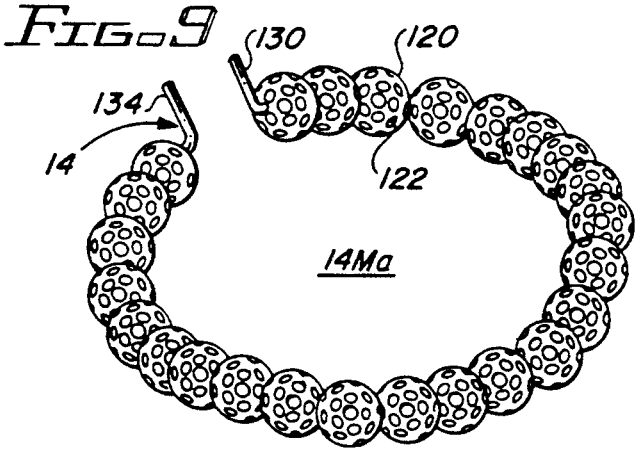
FIG. 9
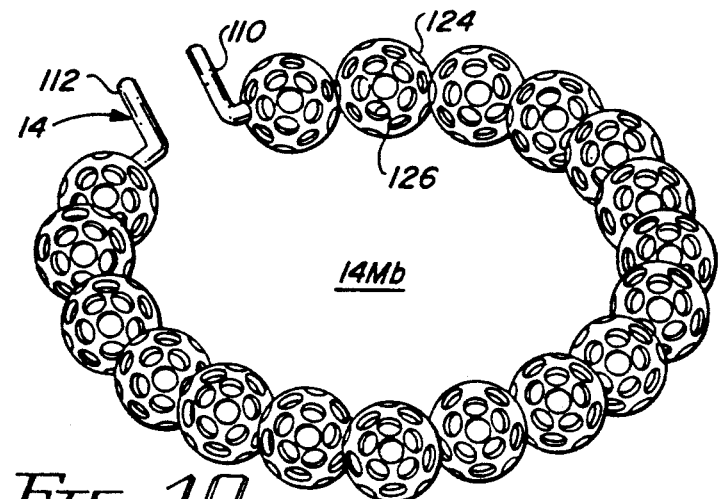
FIG. 10
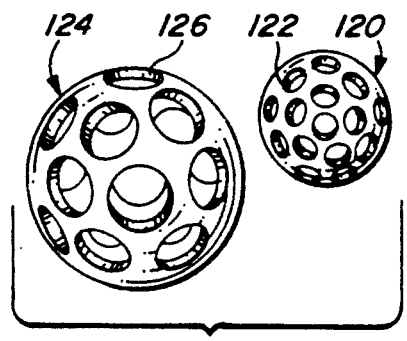
FIG. 8

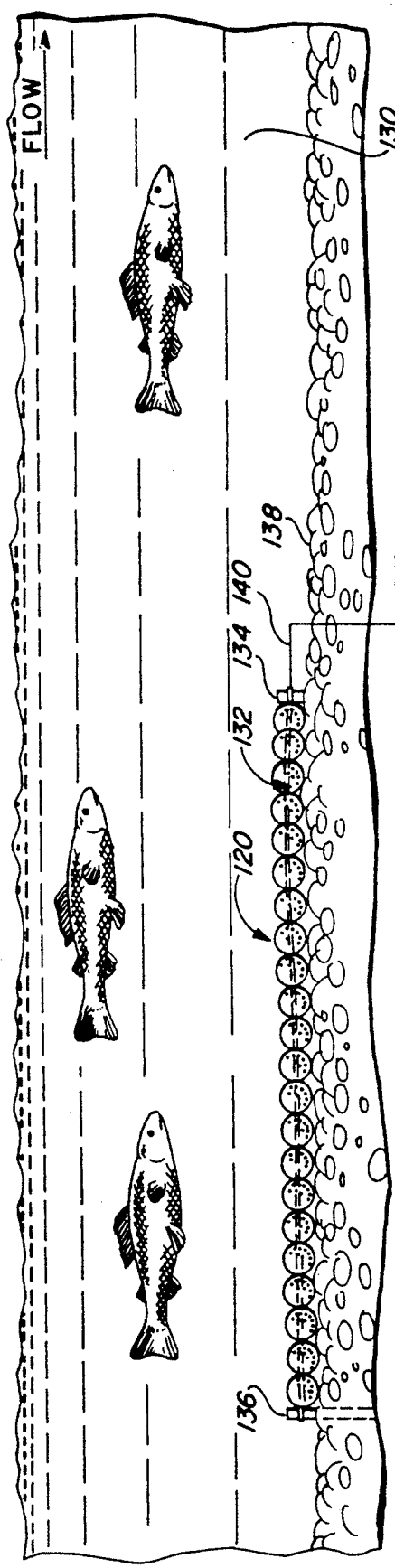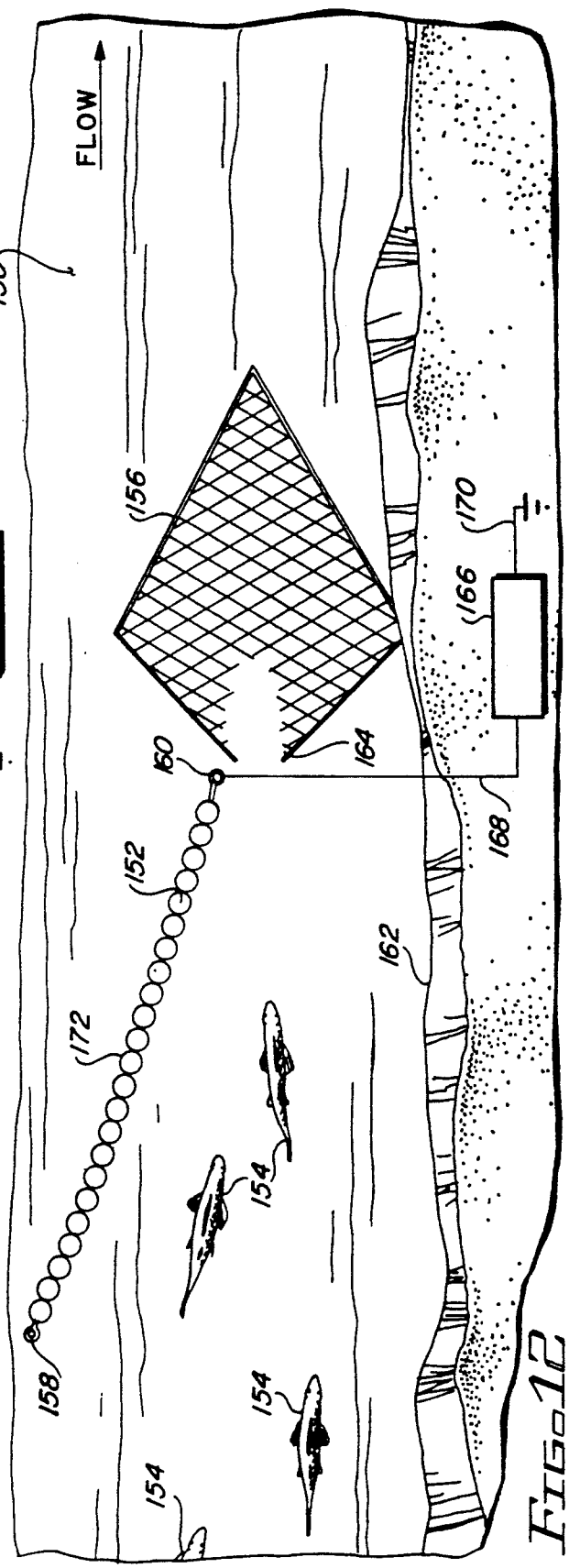
Fig. 11
Fig. 12

ELECTROFISHING POLE

BACKGROUND OF THE INVENTION

1. Field of the Invention

The present invention relates to apparatus attendant electrofishing and, more particularly, to a barrier for shielding an electrode used in electrofishing.

2. Description of Related Art

Portable electrofishing units have been used for many years. Such units include an electronic power system incorporating a power source and a signal generator for generating the signal or pulse train to be transmitted between a submerged anode electrode and a submerged cathode electrode. Usually, the electronic power system is of a backpack configuration carried by an operator. A trailing wire is suspended from the backpack and includes a bare conductor disposed beneath the water surface and serving as a cathode electrode. The operator wields a wand or pole supporting a bare hoop like element serving as an anode electrode and disposed beneath the water surface. Electrofishing equipment which provides two hand held electrodes is also available as some operators prefer to hold the anode electrode in one hand and the cathode electrode in the other hand. The voltage applied between the anode and cathode electrodes, which voltage may be in the range of 500 to 1000 volts, establishes an electric field within the water. It is well known that fish responding to an electric field are attracted to the anode electrode and repelled from the cathode electrode. Any fish experiencing a voltage gradient along a radial from the anode electrode, which voltage gradient is greater than the rheobase voltage of the fish, will have a neuromuscular reaction. The neuromuscular reactions are stepwise incremental as a function of the stimulation resulting from increasing field strength. These incremental neuromuscular reactions are categorized as follows: a) produces random swimming stimulation above the rheobase voltage (electrotaxis); b) at a higher threshold of stimulation in a dc field, the fish will swim toward the anode electrode (galvanotaxis); c) at a yet higher threshold of stimulation, muscular activity ceases (flaccidity) and the fish becomes unconscious (it does not react to external stimulation, such as being touched or handled); and d) at maximum stimulation, the fish becomes completely rigid (tetany, tonic contractions), even to the point of muscular quivering (clonic contractions).

The greatest voltage gradient across the fish occurs when it is aligned with a radial from the anode electrode and the lowest voltage gradient across the fish will occur when it is broadside to a radial from the anode electrode. Other complex factors, such a different species having different flesh and therefore electrical conductivity, also affect the distance from the anode electrode at which the voltage gradient affecting the fish exceeds the rheobase voltage of the fish. Direct contact by the fish with the anode electrode increase the possibility of injuries of a severe nature or death.

The configuration of the anode electrode affects the distribution of power and the resulting electric field. Is has been determined empirically that an anode electrode shaped as an open ended circular loop or as a diamond shape works admirably well. However, for particular purposes or in particular locations, elongated or specially configured anode electrodes may provide the results sought.

Because of the high voltage between the anode and cathode electrodes, a safety hazard to an operator, usually wading in a pond, lake, stream or other body of water, exist. Should the operator inadvertently contact the bare anode electrode, shock and unconsciousness may occur and result in injury or drowning. Should the bare anode and cathode electrodes contact one another, the resulting short circuit may damage the signal generating equipment and/or power supply and render the electronic power system inoperative. When a second operator is employed to net the fish drawn to the anode electrode, inadvertent contact with the anode electrode may occur directly or through contact with the net frame held by the second operator. The results could be devastating.

SUMMARY OF THE INVENTION

A bare uninsulated anode electrode disposed at the end of an electrofishing pole is shielded by a water permeable barrier of electrical non conducting material to prevent physical contact with the bare anode electrode while accommodating a free flow of water into and out of the barrier and in contact with the anode electrode. The barrier is supported by a minimal number of support points on the anode electrode to minimize electrical insulation of the anode electrode from the water in which it is immersed. The barrier shields the bare anode electrode from direct contact by the fish or other objects. Moreover, the barrier prevents inadvertent physical contact with the anode electrode by the operator or by other persons or their equipment. The barrier also precludes inadvertent contact between the anode and cathode electrodes and the possibility of a short circuit is avoided. Where the cathode electrode is used to repel fish and the anode electrode is grounded, the barrier is used with the cathode electrode.

It is therefore a primary object of the present invention to provide a protective barrier for shielding the exposed electrode of an electrofishing pole.

Another object of the present invention is to provide a physical barrier to prevent contact by fish with the anode electrode of an electrofishing pole.

Yet another object of the present invention is to provide a barrier for preventing a short circuit between the anode and cathode electrodes of electrofishing equipment.

Still another object of the present invention is to provide a barrier for an electrofishing conductor which barrier is useable with any of various configurations of the conductor.

A further object of the present invention is to provide a barrier for the electrode an electrofishing pole, which barrier has a minimal electrical insulating effect against transmission of electrical power to the water.

A yet further object of the present invention is to provide an inexpensive barrier for use with bare electrodes of electrofishing equipment.

A still further object of the present invention is to provide a method for preventing contacting with bare electrodes of electrofishing equipment without impeding the transmission of power and creation of an electric field in the water.

These and other objects of the present invention will become apparent to those skilled in the art as the description therein proceeds.

BRIEF DESCRIPTION OF THE DRAWINGS

The present invention will be described with greater specificity and clarity with reference to the following drawings, in which:

FIG. 1 illustrates an operator using an electrofishing pole in a body of water;

FIG. 2 is a perspective view of the handle of the electrofishing pole;

FIG. 3 is a cross-sectional view taken along lines 3—3, as shown in FIG. 2;

FIG. 4 is a detailed partial cross-sectional view of the loop supporting element of the pole;

FIG. 5 is an end view of the loop supporting element;

FIGS. 6a, 6b, 6c and 6d illustrate representative loop configurations;

FIG. 7 illustrates alternative attachment of different loops to the loop supporting element;

FIG. 8 illustrates one embodiment of two different sized barrier elements that may be used with a loop;

FIGS. 9 and 10 illustrate different diameter loops having a commensurately sized barrier formed thereabout to protect against contact with the loop extending from the electrofishing pole;

FIG. 11 illustrates a barrier useable in conjunction with a straight electrode anchored to the bottom of a stream or river bed to channel the flow of fish; and FIG. 12 illustrates a top view of a barrier disposed about a straight electrode anchored to a river bottom for the purpose of channeling fish into a trap.

DESCRIPTION OF THE PREFERRED EMBODIMENT

Referring to FIG. 1, there is illustrated an operator 10 in the process of electrofishing in a body of water. The operator is holding a wand 12 of electrically insulating material supporting a submerged loop 14. The loop serves as an anode electrode for transmitting packets of high frequency pulses at a low frequency repetition rate. To assist in protecting against electrical shock, the operator may wear gloves 16 of rubber or other electrical insulating material. A back frame 18 worn by operator 10 supports a power source 20, which may be a battery or electrical generator. An electrical circuit unit 22, receiving power from the power source, has an output of DC pulses electrically connected via an electrical conductor with an anode electrode represented by loop 14. The cathode electrode, connected to the output of the electrical circuit unit, may be in the form of a conductor 24 extending from the electrical circuit unit into the water. The submerged part 26 of conductor 24 is uninsulated while the exposed segment 28 of the conductor may be insulated.

In operation, the positive pulses emitted by loop 14 in combination with cathode electrode 26 induce an electric field within the body of water. Any fish within the electric field and experiencing a voltage gradient across their bodies equivalent to or greater than the respective fish's rheobase voltage will be induced to enter a state of electrotaxis. The electrotaxis causes involuntary muscular responses resulting in a swimming action toward loop 14. At some point in proximity to the loop, the location being dependant upon the field strength and the length of the fish, a state of petit mal will occur. In the petit mal state, the fish loses consciousness and the muscles become flaccid. Operator 10, or an assistant, would net the fish and place it within a holding tank for inspection, analysis or other processing.

The muscular stimulation provided by the transmitted pulses causes electrotaxis. By maintaining an appropriate pulse repetition frequency sufficiently low, relaxation of the white muscle tissues will occur between the stimulating pulses. Such relaxation will avoid the otherwise occurring myoclonic jerks. Such myoclonic jerks, when present, tend to cause damage to the spine of the fish and cause injury to the soft tissues. For studies relating to endangered species, such injuries are unacceptable. With respect to fish that are to be analyzed, tagged and returned, only a low injury rate is even marginally acceptable. By incorporating a pulse train of the type described in copending patent application entitled "ELECTROFISHING APPARATUS AND METHOD", Serial No. 446,652, now U. S. Pat. No. 5,111,379, injuries to the fish are avoided.

The voltage between the anode electrode, loop 14, and the cathode electrode, exposed part 26 of conductor 24, may be in the range of 500 to 1000 volts. In the event the two conductors touch one another and short circuit unit 22, destructive damage is likely. Furthermore, damage to power source 20 due to an immediate rise in current is highly likely. Fuses and other short circuit responsive devices are generally inadequate to prevent damage to the electrical and electronic components. Furthermore, contact by operator 10 with the anode electrode may cause severe burns and/or shock. In the event the operator loses his/her balance or consciousness, the operator may drown or suffer injuries from falling. An assistant, performing the primary function of netting fish in a petit mal state, may suffer similar injury or fatality if contact with loop 14 occurs directly or through the net frame held by the assistant.

Referring jointly to FIGS. 2 through 5, details of wand 12 will be described. The wand generally includes a length of fiberglass tubing 40 or tubing or other non-electrically conductive material. A fixture 42 is attached at one end of the tubing for the purpose of detachably attaching loop 14 serving as the anode electrode. The fixture also interconnects the loop with conductor 44 extending from circuit unit 22 through tubing 40 to an electrical connection with fixture 42. The fixture includes a plug 46 disposed within the end of the tubing. The plug includes a pair of bores 48,50 sized to receive the ends of loop 14, which ends are typically ⅛ of an inch in diameter. The plug is retained on tubing 40 by set screw 52 or the like. To secure the ends of the loop in bores 48,50 threaded shank 54 of a bolt 55 partially intrudes into each of the bores to frictionally engage and lock the ends of loop 14 inserted into the bores.

The diametric size of loop 14 has an effect upon the efficiency of power transmission and uniformity. The larger the diameter of the conductor forming the loop, the more powerful is the field generated for a given power output. Moreover, the larger the diameter of the conductor, the more heavy is the equipment and it becomes somewhat more unwieldy. To accommodate loops of different diameter conductor or material, fixture 42 may include a further element 56 having a bore 58 for penetrably receiving the end of wand 40. Element 56 includes a pair of bores 60,62 for receiving the ends of loop 40. As illustrated in FIG. 5, the diameters of bores 60,62 may be on the order of ¼ inch compared with the diameters of bores 48,50 being ⅛ of an inch. Set screws 64,66 secure the ends of loop 14 in bores 60,62. When element 56 is used, set screw 52 and bolt 55 extend through corresponding parts of plug 46 and the end of wand 40.

Referring jointly to FIGS. 3 and 4, details of the electrical connections associated with wand 12 will be described. Conductor 44, which is electrically insulated, extends into wand 40 through a plug 70 or the like at the upper end of the wand. An on-off switch 72 is mounted in the wall of tubing 40 to permit an operator to energize and de-energize loop 14 at will. A conductor 74 extends from switch 72 to a bore 76 formed in plug 46. Prior to insertion within the bore, the insulation is stripped from conductor 74 in order to insert bare wire 78 into bore 76. A set screw 80 threadedly engages threaded bore 82 in the plug to engage and mechanically lock wire 78 within bore 76. Set screw 52 and bolt 55 electrically interconnect plug 48 and element 56 to permit application of electrical power to a loop engaged with either bores 48,50 or 60,62.

Referring jointly to FIGS. 6a, 6b, 6c and 6d, there are shown various commonly used configurations and sizes of loop 14. Loop 14a illustrated in FIG. 6a is of approximately ¼ diameter stainless steel rod bent into a relatively large circle 90 and includes bent ends 92,94. FIG. 6b illustrates a similar but smaller diameter loop 14b having a circle 96 and bent ends 98,100. FIG. 6c illustrates a loop 14c formed as a diamond 102 and having bent ends 104,106. FIG. 6d illustrates loop 14d formed as a circle 108 and having bent ends 110,112. Loop 14d is formed of relatively large diameter, nominally ½ inch, stainless steel rod. As illustrated in FIG. 7, the bent ends of any of loops 14a, 14b or 14c are inserted and secured within bores 48,50. Ends 110,112 of loop 14d are inserted and secured within bores 60,62 of fixture 42.

To prevent accidental contact by operator 10 or an assistant with fixture 42, the exterior surface of the fixture may be encased within a coating of insulating material or within an appropriately configured insulating sleeve. Loop 14 may not be covered by insulating material since such insulation would preclude transmission of electrical energy into the water and the electrical field desired would not be established. To prevent inadvertent and accidental contact with loop 14, it is necessary to create a barrier or wall about and around the loop to prevent contact with the loop and yet permit continuing and ongoing contact between the loop and the water upon immersion.

There have been available for some years plastic practice balls sized to conform with a golf ball, baseball or softball; some have been referred to as "whiffle" balls and others are sold under the trademark "Fun Balls". These balls are hollow and their walls are of relatively thin and relatively robust material. The wall of the hollow balls is perforated with a multitude of apertures. The golf ball size balls have apertures of approximately ¼ inch in diameter while the balls of baseball and softball size have apertures of approximately ½ inch in diameter.

Referring to FIG. 8, there is shown a golf ball size hollow sphere 120 having a plurality of apertures 122 formed in its wall. These apertures are nominally ¼ inch in diameter. Hollow sphere 124 is larger in diameter than sphere 120. It includes a plurality of apertures 126 formed in its wall, which apertures are nominally ½ inch in diameter. As illustrated, the wall thickness of spheres 120,124 is relatively thin and is primarily a function of the degree of robustness required to prevent collapse and the type of material employed.

Referring to FIG. 9 there is shown a representative modified loop 14, which may be like any of loops 14a, 14b or 14c, having a plurality of spheres 120 threadedly engaging the segment of the loop intermediate ends 130,134. In this configuration, loop 14 is nominally made of a stainless rod having a diameter of ⅛ of an inch to penetrate similar sized apertures 122 in the walls of the spheres. As illustrated, a plurality of spheres are used of a number necessary to extend about the loop from end 130 to end 134. These spheres, due to their apertures, permit free contact between the loop serving as one of the electrodes and the water flowing into the spheres. Thus, the electric field sought to be established by loop 14 can and will be established. Because spheres 120 are of electrically insulating material, they serve in the manner of a wall or barrier to prevent contact with loop 14 by an operator, an assistant or even the cathode electrode. Because of the ready availability and minimal expense of the commercially available apertured spheres, a very effective and low cost modification can be made to loop 14 to render it completely safe for use.

FIG. 10 illustrates a modified loop 14 formed of a stainless steel rod having a nominal rod diameter of ½ inch, such as loop 14d shown in FIG. 6d. For this loop, constructed of ½ inch diameter rod, larger spheres 124 shown in FIG. 8 may be used. These spheres are threaded onto loop 14 to extend between ends 110,112. Thereby, loop 14 is shielded by spheres 124 and the spheres form a wall or barrier to prevent accidental or inadvertent contact with loop 14. Moreover, the apertures in the spheres permit free contact between the loop and the water in which the loop is immersed.

At the point of contact between spheres 120 and modified loop 14 or at the point of contact between spheres 124 and modified loop 14, a slight electrical insulating effect will exist. However, empirical testing has indicated that the resulting degradation of the electric field produced is sufficiently insignificant to affect the efficiency of electrofishing. Moreover, variations in water salinity, water conductivity, proximity of shoreline, smoothness of bank or bottom of the body of water, have far more variable effect upon the electric field than the insulating bands about the loop presented by the contact between the loop and the corresponding apertures of the spheres.

For various studies and for control of aquatic animals it is beneficial and helpful to direct such animals toward or away from the bank or bottom of a riverbed, pond, lake or the like. Apparatus use in electrofishing and variants thereof have been used for such purposes. Furthermore, it is well known that aquatic animals, particularly fish, are drawn toward an immersed anode electrode and repelled from an immersed cathode electrode. This phenomena is used to direct or shepherd fish toward or away from a particular area. One danger present with an immersed electrode is that of contact with the electrode by the fish since such contact increases the likelihood of injury, if not fatality. For endangered species, this problem has severe magnitude.

Referring to FIG. 11, there is illustrated a structure and method for controlling the movement of fish without subjecting such fish to the dangers attendant contact with a submerged electrode. In a typical stream 130 (or pond, lake or other body of water), an electrode 132 is placed upon or staked by stakes 134,136 adjacent bed 138 or the bank of the stream. The electrode is uninsulated and is usually a bare wire. Preferably, stakes 134,136 suspend electrode 132 therebetween and are electrically insulated or of electrical insulating material.

A conductor 140, which is usually insulated, interconnects electrode 132 with circuit unit 142 to provide the necessary pulses to establish the electric field. As illustrated, electrode 132 represents an anode electrode. The cathode electrode 144 extends from circuitry 142 and is grounded. The grounded electrode may be a spike or a mesh of electrical conductors placed upon or in the ground. It is to be understood that under different circumstances, electrode 132 may be the cathode electrode while electrode 144 may be the anode electrode.

To place electrode 132 so as to provide the strongest and most uniform electric field possible, it is preferable that the electrode not lie upon the riverbed or bottom of a body of water. Furthermore, it is preferable that a wall or barrier be provided to prevent contact between the fish and the electrode. Both of these benefits are achieved by threading electrode 132 through a plurality of apertured spheres, such as spheres 120,124 illustrated in FIG. 8. These spheres will maintain conductor 132 off of bed 138 and serve as the barrier. By using a sufficient number of spheres to place them adjacent one another between stakes 134 and 136, essentially the full length of the electrode is shielded by the barrier established by the spheres. If the spheres are buoyant, they will assist in raising the electrode and maintaining the electrode floating above bed 138. However, such floatation is not mandatory. If electrode 132 is the anode the fish will be attracted to it and if it is the cathode electrode, the fish will be repelled from it. Thus, movement of the aquatic animals, fish, can be directed.

Referring to FIG. 12, there is illustrated a top view of a stream 150. It depicts a practical use of a cathode electrode 152 immersed in the stream for the purpose of directing fish 154 away from the cathode electrode and into a trap 156. Cathode electrode 152 is uninsulated and extends between stakes 158,160. Preferably, these stakes are electrically nonconductive to prevent potential injury to fish 154. These stakes are positioned to orient cathode electrode 152. Any fish 154 within the space between cathode electrode 152 and bank 162 will be urged away from the cathode electrode toward the bank. Ultimately, these fish, presumptively swimming downstream, will be urged into trap 156 through inlet 164. Once in the trap, they may be netted or retained captive, depending upon the purposes for trapping the fish.

Power to cathode electrode 152 is provided by circuit unit 166 having an output connected to cathode electrode 152 through insulated conductor 168. Anode electrode 170 may be grounded by a spike or by a mesh of electrically conductive material on or in the ground or river bed. To prevent contact by fish 154 with cathode electrode 152, a plurality of spheres 172, which may be like spheres 120,124 illustrated in FIG. 8, are threaded upon the cathode electrode. Preferably, a sufficient number of spheres are threaded upon the cathode electrode to form a wall or barrier along the full length of the cathode electrode. The barrier will prevent the fish from contacting the cathode electrode. Moreover, the spheres will maintain the electrode off the river bottom which provides a more powerful and more uniform electrical field more easily sensed by and influencing the fish. In the apparatus illustrated in FIG. 12 and depending upon the nature of the movement of the fish to be influenced or controlled, electrode 152 may be the anode electrode and electrode 170 the cathode electrode if the fish are to be attracted toward electrode 152.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. A submersible barrier for shielding a portable manually manipulatable anode electrode of a pair of anode and cathode electrodes used with portable electrofishing apparatus to be supported by an operator, which apparatus includes an electric circuit unit electrically connected with the anode and cathode electrode for providing DC pulses, said barrier comprising in combination:
   a) a wall disposed about the portable anode electrode for shielding the portable electrode against contact by the operator or other objects when the portable anode electrode is out of the water and for shielding the portable anode electrode against contact by the operator, fish and other objects when the portable anode electrode is in the water;
   b) means for accommodating water flow through said wall to establish an electric field in the water surrounding the portable anode electrode;
   c) means for securing and maintaining said wall about the portable anode electrode when the portable anode electrode is manipulated into and out of the water by the operator; and
   d) means for transporting said electrofishing apparatus during use of said electrofishing apparatus.

2. The barrier as set forth in claim 1 wherein said accommodating means comprises a plurality of apertures.

3. The barrier as set forth in claim 1 wherein said wall is of electrically non conducting material.

4. The barrier as set forth in claim 1 wherein said wall includes means for mounting said wall upon different configurations of the electrode.

5. The barrier as set forth in claim 1 wherein said wall includes a plurality of segregable elements, each of said elements including wall means for engaging the portable electrode to support said element upon the portable electrode.

6. The barrier as set forth in claim 5 wherein said accommodating means comprises apertures disposed in said wall means of each element of said plurality of elements.

7. The barrier as set forth in claim 6 wherein said securing means comprises at least a pair of said apertures disposed in each of said wall means for penetrably receiving the electrode.

8. A barrier for shielding an electrode of a pair of electrodes used with electrofishing apparatus, said barrier comprising in combination:
   a) a wall disposed about the electrode, said wall including a plurality of segregable elements, each of said elements comprising a hollow sphere having a spherical wall;
   b) means for accommodating water flow through said wall to establish an electric field in the water surrounding the electrode; and
   c) means for securing said wall about the electrode.

9. The barrier as set forth in claim 8 wherein said accommodating means comprises apertures disposed in said spherical wall.

10. The barrier as set forth in claim 9 wherein said securing means comprises at least two of said apertures penetrably engaged by the electrode.

11. The barrier as set forth in claim 9 wherein said apertures comprise at least two diametricly opposed apertures and wherein said securing means comprises said two diametrically opposed apertures penetrably engaged by the electrode.

12. A barrier for shielding at least one electrode of a pair of portable electrodes electrically interconnected with, supported by and extending from a portable operator carried electrofishing apparatus to prevent contact with the one electrode without significantly degrading the electrical field established between the pair of electrodes upon use of the electrofishing apparatus in a body of water, said barrier comprising in combination:
   a) a water permeable wall of electrically non conductive material disposed about the major part of the one electrode;
   b) means for securing said wall with the one electrode, said securing means including means for maintaining essentially all of said wall spaced apart from the one electrode; and
   c) means for transporting the electrofishing apparatus during use of the electrofishing apparatus in the body of water.

13. The barrier as set forth in claim 12 wherein said wall includes a plurality of apertures.

14. The barrier as set forth in claim 13 wherein said securing means comprises at least one of said apertures for penetrably receiving the electrode to be shielded.

15. The barrier as set forth in claim 14 wherein said wall comprises a plurality of segregable elements.

16. A barrier for shielding at least one of a pair of electrodes of electrofishing apparatus to prevent contact with the shielded electrode without significantly degrading the electrical field established between the pair of electrodes upon actuating the electrofishing apparatus, said barrier comprising in combination:
   a) a water permeable wall of electrically non conductive material disposed about the major part of the shielded electrode, said wall comprising a plurality of segregable elements and wherein each element of said plurality of elements comprises a hollow sphere having an apertured spherical wall; and
   b) means for securing said wall with the electrode to be shielded.

17. The barrier as set forth in claim 16 wherein said apertured spherical wall includes a plurality of apertures and wherein said securing means comprises at least two of said apertures penetrably receiving the shielded electrode.

18. Portable apparatus for electrofishing in a body of water, said apparatus comprising in combination:
   a) at least a pair of portable electrodes capable of being carried by the operator and capable of being manipulated by the operator during use, one of said electrodes being an anode electrode and the other of said electrodes being a cathode electrode;
   b) portable means for generating and transmitting an electrical signal between said pair of portable electrodes to create an electrical field therebetween, said generating and transmitting means including means for carrying said generating and transmitting means by the operator during such signal generation and transmission; and
   c) means for shielding at least one electrode of said pair of portable electrodes against contact of said one electrode by the operator or an object, said shielding means being water permeable to permit creation of the electrical field in water upon immersion of said pair of electrodes into the body of water.

19. The apparatus as set forth in claim 18 wherein said shielding means comprises a plurality of segregable elements, each of said elements being mounted upon said at least one electrode.

20. Apparatus for electrofishing in a body of water, said apparatus comprising in combination:
   a) at least a pair of electrodes, one of said electrodes being an anode electrode and the other of said electrodes being a cathode electrode;
   b) means for generating and transmitting an electrical signal between said pair of electrodes to create an electrical field therebetween; and
   c) means for shielding at least one electrode of said pair of electrodes against contact by a person or object, said shielding means being water permeable to permit creation of the electrical field upon immersion into the body of water of said pair of electrodes, said shielding means comprising a plurality of segregable elements and wherein each element of said plurality of elements comprises a hollow sphere.

21. The apparatus as set forth in claim 20 wherein said shielding means includes aperture means disposed in each of said spheres for penetrably receiving the shielded electrode.

22. A method for shielding a manually manipulatable electrode of a pair of electrodes used with electrofishing apparatus transported by an operator during use, said method comprising the steps of:
   a) mounting the electrofishing apparatus upon the operator;
   b) establishing a barrier about the manipulatable electrode to shield the manipulatable electrode against contact with the operator or an other object;
   c) supporting at least the major part of the barrier in a spaced apart relationship with the manipulatable electrode; and
   d) accommodating water flow through the barrier to establish enveloping contact between the water and the manipulatable electrode upon immersion of the manipulatable electrode in a body of water during electrofishing.

23. The method as set forth in claim 22 including the step of penetrably securing the barrier upon the manipulatable electrode.

24. The method as set forth in claim 22 wherein said step of supporting includes the step locating a plurality of adjacent elements constituting the barrier along the electrode.

25. A method for shielding an electrode used with electrofishing apparatus, said method comprising the steps of:
   a) establishing a barrier about the electrode to shield the electrode against contact with a person or object, said step of establishing includes the step locating a plurality of adjacent elements constituting the barrier about the electrode and wherein said step of locating includes the step of penetrably engaging a plurality of hollow apertured spheres along the electrode; and
   b) accommodating water flow through the barrier to establish enveloping contact between the water and the shielded electrode upon immersion of the electrode in a body of water during electrofishing.

* * * * *